US009260808B2

(12) United States Patent
Schmidt et al.

(10) Patent No.: US 9,260,808 B2
(45) Date of Patent: Feb. 16, 2016

(54) FLEXIBLE COFORM NONWOVEN WEB

(75) Inventors: Michael A. Schmidt, Alpharetta, GA (US); Kenneth B. Close, New London, WI (US); David M. Jackson, Alpharetta, GA (US); Lisa L. Nickel, Menasha, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 575 days.

(21) Appl. No.: 12/643,123

(22) Filed: Dec. 21, 2009

(65) Prior Publication Data

US 2011/0151196 A1    Jun. 23, 2011

(51) Int. Cl.
*B32B 3/30* (2006.01)
*D04H 5/08* (2012.01)
*A47L 13/16* (2006.01)
*A47L 13/20* (2006.01)
*B32B 5/02* (2006.01)
*D04H 3/16* (2006.01)
*D04H 1/407* (2012.01)

(52) U.S. Cl.
CPC *D04H 5/08* (2013.01); *A47L 13/16* (2013.01); *A47L 13/20* (2013.01); *B32B 3/30* (2013.01); *B32B 5/022* (2013.01); *D04H 1/407* (2013.01); *D04H 3/16* (2013.01); *B32B 2509/00* (2013.01); *B32B 2555/00* (2013.01); *B32B 2555/02* (2013.01); *Y10T 428/24612* (2015.01); *Y10T 442/68* (2015.04)

(58) Field of Classification Search
CPC ...... B32B 3/30; B32B 5/022; B32B 2550/00; B32B 2550/02; B32B 2555/00; B32B 2555/02; A47L 13/16; A47L 13/20; D04H 1/407

USPC .............. 428/156; 604/385.01; 442/327, 400, 442/415
See application file for complete search history.

(56) References Cited

U.S. PATENT DOCUMENTS

| 3,034,180 A | 5/1962 | Greiner et al. |
| 3,110,609 A | 11/1963 | Bletzinger |
| 4,042,740 A | 8/1977 | Krueger |

(Continued)

FOREIGN PATENT DOCUMENTS

| EP | 0 333 228 A2 | 9/1989 |
| EP | 0 604 736 A2 | 7/1994 |

(Continued)

OTHER PUBLICATIONS

Srinivas, S. et al., "Elastic Nonwoven Fabrics from Polyolefin Elastomers," (Vistamaxx™), Society of Plastics Engineers Annual Technical Conference (ANTEC), vol. 3, May 2005, Boston, MA, pp. 1247-1251.

(Continued)

*Primary Examiner* — Donald J Loney (57) ABSTRACT

A flexible coform nonwoven web that contains a matrix of meltblown fibers and an absorbent material is provided. The meltblown fibers may constitute from about 2 wt % to about 40 wt % of the coform web. The absorbent material may constitute from about 60 wt % to about 98 wt % of the coform web. The Cup Crush Energy/Thickness ratio of the nonwoven structure is desirably less than about 600. The coform web may be imparted with a three-dimensional texture by, for example, using a three-dimensional forming surface. The coform web is suitable for forming absorbent articles such as wipers and personal care absorbent products.

7 Claims, 5 Drawing Sheets

(56) References Cited

U.S. PATENT DOCUMENTS

| | | |
|---|---|---|
| 4,100,324 A | 7/1978 | Anderson et al. |
| 4,103,058 A | 7/1978 | Humlicek |
| 4,531,945 A | 7/1985 | Allison |
| 4,637,819 A | 1/1987 | Ouellette et al. |
| 4,724,114 A | 2/1988 | McFarland et al. |
| 4,741,941 A | 5/1988 | Englebert et al. |
| 4,762,521 A | 8/1988 | Roessler et al. |
| 4,879,170 A | 11/1989 | Radwanski et al. |
| 5,096,995 A | 3/1992 | Fukumoto et al. |
| 5,149,335 A | 9/1992 | Kellenberger et al. |
| 5,180,620 A | 1/1993 | Mende |
| 5,213,881 A | 5/1993 | Timmons et al. |
| 5,242,632 A | 9/1993 | Mende |
| 5,350,624 A | 9/1994 | Georger et al. |
| 5,423,786 A | 6/1995 | Fung et al. |
| 5,508,102 A | 4/1996 | Georger et al. |
| 5,562,645 A | 10/1996 | Tanzer et al. |
| 5,575,874 A | 11/1996 | Griesbach, III et al. |
| 5,604,284 A | 2/1997 | Ueda et al. |
| 5,643,653 A | 7/1997 | Griesbach, III et al. |
| 5,652,326 A | 7/1997 | Ueda et al. |
| 5,665,396 A | 9/1997 | Ulman |
| 5,672,248 A | 9/1997 | Wendt et al. |
| 5,733,274 A | 3/1998 | Osborn, III |
| 5,858,292 A | 1/1999 | Dragoo et al. |
| 5,886,098 A | 3/1999 | Ueda et al. |
| 5,964,743 A | 10/1999 | Abuto et al. |
| 6,010,588 A | 1/2000 | Stahl et al. |
| 6,039,839 A | 3/2000 | Trokhan et al. |
| 6,127,595 A | 10/2000 | Makoui et al. |
| 6,231,557 B1 | 5/2001 | Krautkramer et al. |
| 6,245,051 B1 | 6/2001 | Zenker et al. |
| 6,362,389 B1 | 3/2002 | McDowall et al. |
| 6,468,626 B1* | 10/2002 | Takai et al. .................. 428/136 |
| 6,627,789 B1 | 9/2003 | Vandenbogart et al. |
| 6,680,423 B1 | 1/2004 | Tanzer |
| 6,810,553 B1* | 11/2004 | Otsuji et al. ................... 15/227 |
| 6,844,481 B2 | 1/2005 | Taneichi et al. |
| 6,896,669 B2 | 5/2005 | Krautkramer et al. |
| 7,101,622 B2 | 9/2006 | Chang et al. |
| 7,594,904 B2 | 9/2009 | Rosenfeld et al. |
| 7,662,745 B2 | 2/2010 | Zhang et al. |
| 8,043,984 B2 | 10/2011 | Stadelman et al. |
| 2002/0155776 A1 | 10/2002 | Mitchler et al. |
| 2003/0077970 A1* | 4/2003 | DeLucia et al. ............. 442/398 |
| 2003/0113463 A1 | 6/2003 | Ko et al. |
| 2003/0120233 A1 | 6/2003 | Ohshima et al. |
| 2003/0120249 A1 | 6/2003 | Wulz et al. |
| 2003/0135178 A1 | 7/2003 | Hansen |
| 2003/0149411 A1 | 8/2003 | Keuhn et al. |
| 2003/0176136 A1 | 9/2003 | Wadsworth |
| 2003/0200991 A1 | 10/2003 | Keck et al. |
| 2003/0211802 A1 | 11/2003 | Keck et al. |
| 2003/0236511 A1 | 12/2003 | Jones et al. |
| 2004/0005457 A1 | 1/2004 | Delucia et al. |
| 2004/0054343 A1 | 3/2004 | Barnett et al. |
| 2004/0102751 A1 | 5/2004 | Schueler |
| 2004/0253892 A1 | 12/2004 | Baker et al. |
| 2004/0265534 A1 | 12/2004 | Curro et al. |
| 2005/0061356 A1 | 3/2005 | Wong et al. |
| 2005/0148261 A1 | 7/2005 | Close et al. |
| 2005/0228350 A1 | 10/2005 | Ranganathan et al. |
| 2006/0004336 A1 | 1/2006 | Zhang et al. |
| 2006/0052022 A1 | 3/2006 | Suzuki et al. |
| 2006/0058761 A1 | 3/2006 | Kudo et al. |
| 2006/0063456 A1 | 3/2006 | Carter |
| 2006/0141881 A1 | 6/2006 | Bergsten et al. |
| 2006/0184149 A1 | 8/2006 | Kasai et al. |
| 2006/0199006 A1 | 9/2006 | Poon et al. |
| 2007/0049153 A1* | 3/2007 | Dunbar et al. ................ 442/400 |
| 2007/0065643 A1 | 3/2007 | Kopacz et al. |
| 2007/0135785 A1 | 6/2007 | Qin et al. |
| 2007/0197117 A1 | 8/2007 | Austin et al. |
| 2008/0119103 A1 | 5/2008 | Ng et al. |
| 2008/0177242 A1 | 7/2008 | Chang et al. |
| 2009/0062760 A1 | 3/2009 | Wright et al. |
| 2009/0111347 A1 | 4/2009 | Peng et al. |
| 2009/0233049 A1 | 9/2009 | Jackson et al. |
| 2011/0152808 A1 | 6/2011 | Jackson |

FOREIGN PATENT DOCUMENTS

| | | |
|---|---|---|
| EP | 0 617 940 A2 | 10/1994 |
| EP | 1 241 288 A2 | 9/2002 |
| EP | 0 794 751 B2 | 1/2003 |
| EP | 1 634 556 A1 | 3/2006 |
| JP | 11-286863 A | 10/1999 |
| JP | 2005-145020 A | 6/2005 |
| JP | 2006-002303 A | 1/2006 |
| JP | 2008-025079 A | 2/2008 |
| KR | 10-2006-0129240 A | 12/2006 |
| KR | 10-2006-0130230 A | 12/2006 |
| KR | 10-2009-0117829 A | 11/2009 |
| WO | WO 98/03133 A2 | 1/1998 |
| WO | WO 2004/062528 A2 | 7/2004 |
| WO | WO 2005/111282 A1 | 11/2005 |
| WO | WO 2007/024447 A1 | 3/2007 |
| WO | WO 2008/073101 A1 | 6/2008 |
| WO | WO 2009/032869 A1 | 3/2009 |

OTHER PUBLICATIONS

VISTAMAXX™ 2320 MDC Datasheet, ExxonMobil Chemical, printed from Internet page www.materialdatacenter.com Feb. 4, 2015.

* cited by examiner

FLEXIBLE COFORM NONWOVEN WEB

BACKGROUND OF THE INVENTION

Coform nonwoven webs, which are composites of a matrix of meltblown fibers and an absorbent material (e.g., pulp fibers), have been used as an absorbent layer in a wide variety of applications, including absorbent articles, absorbent dry wipes, wet wipes, and mops. Coform nonwoven webs may have a textured surface formed by contacting the meltblown fibers with a foraminous surface having three-dimensional surface contours. Softness and flexibility are important characteristics of coform webs for which improvements are continuously sought.

As such, a need currently exists for a coform nonwoven web having improved softness and flexibility characteristics for use in a variety of applications.

SUMMARY OF THE INVENTION

In accordance with one embodiment, a coform nonwoven web is disclosed that includes a matrix of meltblown fibers and an absorbent material. The matrix includes a continuous region and a plurality of offset regions, the continuous region having a cross direction, a machine direction, and a thickness. The continuous region includes a first side, which may be planar, extending in the cross direction and the machine direction and a second side, which may be planar, opposite the first side. The first and second sides are separated by the thickness of the continuous region and the offset regions extend out from the first side. The offset regions may be positioned to define a plurality of first uninterrupted portions of the continuous regions, wherein the first uninterrupted portions of the continuous region do not underlie any offset regions. The first uninterrupted portions of the continuous region may extend in a first direction in the plane of the first side, the first direction may not intersect any offset regions, and the width of the uninterrupted portions divided by the width of the offset regions may be between about 0.3 and about 2.0. The widths are measured perpendicular to the first direction in the plane of the first side. In one embodiment, the continuous region may extend completely under the offset regions.

In one aspect, the thickness of the continuous region may be from about 0.01 millimeters to about 10.0 millimeters.

In another aspect, the density of the continuous region is substantially equal to the density of the offset regions.

In a further aspect, the basis weight of the continuous region may be less than the basis weight of the offset regions.

In an even further aspect, the offset regions may extend from the first side by from about 0.25 millimeters to about 5.0 millimeters.

In one aspect, the first uninterrupted portions of the continuous region may extend in the first direction past at least two, three, or four different offset regions.

In another aspect, the offset regions may be positioned to define a plurality of second uninterrupted portions of the continuous region, the second uninterrupted portions of the continuous region extending infinitely in a second direction without intersecting any offset regions. The first direction may be orthogonal to the second direction.

In one aspect, the meltblown fibers include a propylene/α-olefin copolymer. In a further embodiment, the α-olefin may include ethylene.

In another aspect, the absorbent material includes pulp fibers.

In an even further aspect, the meltblown fibers may constitute from 1 wt % to about 40 wt % of the web and the absorbent material may constitute from about 60 wt % to about 99 wt % of the web.

In another aspect, the Cup Crush Energy/Thickness ratio of the coform nonwoven web may be less than about 600 grams.

In another embodiment, a wipe includes the coform nonwoven web described above. In a further aspect, the wipe may contain from about 150 to about 600 wt % of a liquid solution based on the dry weight of the wipe.

In accordance with a further embodiment, a nonwoven structure includes at least one meltblown fibrous material and at least one secondary fibrous material. The weight ratio of the at least one secondary fibrous material to the at least one meltblown fibrous material may be in between about 40/60 to about 90/10. The Cup Crush Energy/Thickness ratio of the nonwoven structure may be less than about 600 grams.

In another embodiment, the Cup Crush Energy/Thickness ratio of the nonwoven structure may be in a range selected from the ranges consisting of from about 200 grams to about 600 grams, from about 250 grams to about 600 grams, from about 276 grams to about 600 grams, from about 200 grams to about 580 grams, from about 250 to about 580 grams, from about 276 grams to about 580 grams, from about 200 grams to about 500 grams, from about 250 grams to about 500 grams, from about 276 grams to about 500 grams, from about 200 grams to about 400 grams, from about 250 grams to about 400 grams, from about 276 grams to about 400 grams, from about 200 grams to about 380 grams, from about 250 grams to about 380 grams, and from about 276 grams to about 380 grams.

In one aspect, the meltblown fibrous material comprises a propylene/α-olefin copolymer. In a further aspect, the α-olefin includes ethylene.

In another aspect, the nonwoven structure may further include a continuous region and a plurality of offset regions. The continuous region has a cross direction, a machine direction, and a thickness. The continuous region further includes a first side, which may be planar, extending in the cross direction and the machine direction and a second side, which may be planar, opposite the first side. The first and second sides are separated by the thickness of the continuous region, the offset regions extend out from the first side, and the offset regions are positioned to define a plurality of first uninterrupted portions of the continuous regions. The first uninterrupted portions of the continuous region do not underlie any offset regions, the first uninterrupted portions of the continuous region extend in a first direction in the plane of the first side, and the first direction does not intersect any offset regions.

In accordance with another embodiment, a method of forming a coform nonwoven web is disclosed that comprises merging together a stream of an absorbent material with a stream of meltblown fibers to form a composite stream. Thereafter, the composite stream is collected on a forming surface to form a coform nonwoven web.

Other features and aspects of the present invention are described in more detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of reference characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention cover such modifications and variations.

As used herein the term "nonwoven web" generally refers to a web having a structure of individual fibers or threads which are interlaid, but not in an identifiable manner as in a knitted fabric. Examples of suitable nonwoven fabrics or webs include, but are not limited to, meltblown webs, spunbond webs, bonded carded webs, airlaid webs, coform webs, hydraulically entangled webs, and so forth.

As used herein, the term "meltblown web" generally refers to a nonwoven web that is formed by a process in which a molten thermoplastic material is extruded through a plurality of fine, usually circular, die capillaries as molten fibers into converging high velocity gas (e.g., air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 micrometers in diameter, and generally tacky when deposited onto a collecting surface.

As used herein, the term "spunbond web" generally refers to a web containing small diameter substantially continuous fibers. The fibers are formed by extruding a molten thermoplastic material from a plurality of fine, usually circular, capillaries of a spinnerette with the diameter of the extruded fibers then being rapidly reduced as by, for example, educative drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference thereto for all purposes. Spunbond fibers are generally not tacky when they are deposited onto a collecting surface. Spunbond fibers may sometimes have diameters less than about 40 micrometers, and are often between about 5 to about 20 micrometers.

Generally speaking, the present invention is directed to a coform nonwoven web that contains a matrix of meltblown fibers and an absorbent material. Meltblown fibers suitable for use in the fibrous nonwoven structure comprise a thermoplastic composition that may include polyolefins, for example, polyethylene, polypropylene, polybutylene and the like, polyamides, olefin copolymers and polyesters. In accordance with one embodiment, the meltblown fibrous materials used in the formation of the fibrous nonwoven structure are formed from a thermoplastic composition that contains at least one propylene/α-olefin copolymer of a certain monomer content, density, melt flow rate, etc. In certain embodiments, the coform web may be imparted with texture using a three-dimensional forming surface.

Various embodiments will now be described in more detail.

I. Thermoplastic Composition

The thermoplastic composition desirably contains at least one copolymer of propylene and an α-olefin, such as a $C_2$-$C_{20}$ α-olefin, $C_2$-$C_{12}$ α-olefin, or $C_2$-$C_8$ α-olefin. Suitable α-olefins may be linear or branched (e.g., one or more $C_1$-$C_3$ alkyl branches, or an aryl group). Specific examples include ethylene, butene; 3-methyl-1-butene; 3,3-dimethyl-1-butene; pentene; pentene with one or more methyl, ethyl or propyl substituents; hexene with one or more methyl, ethyl or propyl substituents; heptene with one or more methyl, ethyl or propyl substituents; octene with one or more methyl, ethyl or propyl substituents; nonene with one or more methyl, ethyl or propyl substituents; ethyl, methyl or dimethyl-substituted decene; dodecene; styrene; and so forth. Particularly desired α-olefin comonomers are ethylene, butene (e.g., 1-butene), hexene, and octene (e.g., 1-octene or 2-octene). The propylene content of such copolymers may be from about 60 mole % to about 99.5 mole %, in further embodiments from about 80 mole % to about 99 mole %, and in even further embodiments, from about 85 mole % to about 98 mole %. The α-olefin content may likewise range from about 0.5 mole % to about 40 mole %, in further embodiments from about 1 mole % to about 20 mole %, and in even further embodiments, from about 2 mole % to about 15 mole %. The distribution of the α-olefin comonomer is typically random and uniform among the differing molecular weight fractions forming the propylene copolymer.

The density of the propylene/α-olefin copolymer may be a function of both the length and amount of the α-olefin. That is, the greater the length of the α-olefin and the greater the amount of α-olefin present, the lower the density of the copolymer. Generally speaking, copolymers with a higher density are better able to retain a three-dimensional structure, while those with a lower density possess better elastomeric properties. Thus, to achieve an optimum balance between texture and stretchability, the propylene/α-olefin copolymer is normally selected to have a density of about 0.860 grams per cubic centimeter ($g/cm^3$) to about 0.900 $g/cm^3$, in further embodiments from about 0.861 to about 0.890 $g/cm^3$, and in even further embodiments, from about 0.862 $g/cm^3$ to about 0.880 $g/cm^3$. Further, the density of the thermoplastic composition is normally selected to have a density of about 0.860 grams per cubic centimeter ($g/cm^3$) to about 0.940 $g/cm^3$, in further embodiments from about 0.861 to about 0.920 $g/cm^3$, and in even further embodiments, from about 0.862 $g/cm^3$ to about 0.900 $g/cm^3$.

Any of a variety of known techniques may generally be employed to form the propylene/α-olefin copolymer used in the meltblown fibers. For instance, olefin polymers may be formed using a free radical or a coordination catalyst (e.g., Ziegler-Natta). Preferably, the copolymer is formed from a single-site coordination catalyst, such as a metallocene catalyst. Such a catalyst system produces propylene copolymers in which the co-monomer is randomly distributed within a molecular chain and uniformly distributed across the different molecular weight fractions. Metallocene-catalyzed propylene copolymers are described, for instance, in U.S. Pat. No. 7,105,609 to Datta, et al.; U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes. Polymers made using metallocene catalysts typically have a narrow molecular weight range. For instance, metallocene-catalyzed polymers may have polydispersity numbers ($M_w/M_n$) of below 4, controlled short chain branching distribution, and controlled tacticity.

In particular embodiments the propylene/α-olefin copolymer constitutes about 50 wt % or more, in further embodiments about from 60 wt % or more, and in even further embodiments, about 75 wt % or more of the thermoplastic composition used to form the meltblown fibers. In other embodiments the propylene/α-olefin copolymer constitutes at least about 1 wt % and less than about 49 wt %, in particular embodiments from at least about 1% and less than about 45 wt %, in further embodiments from at least about 5% and less than about 45 wt %, and in even further embodiments, from at least about 5 wt % and less than about 35 wt % of the thermoplastic composition used to form the meltblown fibers. Of course, other thermoplastic polymers may also be used to form the meltblown fibers so long as they do not adversely affect the desired properties of the composite. For example, the meltblown fibers may contain other polyolefins (e.g., polypropylene, polyethylene, etc.), polyesters, polyurethanes, polyamides, block copolymers, and so forth. In one embodiment, the meltblown fibers may contain an additional propylene polymer, such as homo polypropylene or a copolymer of propylene. The additional propylene polymer may, for instance, be formed from a substantially isotactic polypropylene homopolymer or a copolymer containing equal to or less than about 10 weight percent of other monomer, i.e., at least about 90% by weight propylene. Such a polypropylene may be present in the form of a graft, random, or block copolymer and may be predominantly crystalline in that it has a sharp melting point above about 110° C., in further embodiments about above 115° C., and in even further embodiments, above about 130° C. Examples of such additional polypropylenes are described in U.S. Pat. No. 6,992,159 to Datta et al., which is incorporated herein in its entirety by reference thereto for all purposes.

In particular embodiments, additional polymer(s) may constitute from about 0.1 wt % to about 50 wt %, in further embodiments from about 0.5 wt % to about 40 wt %, and in even further embodiments, from about 1 wt % to about 30 wt % of the thermoplastic composition. Likewise, the above-described propylene/α-olefin copolymer may constitute from about 50 wt % to about 99.9 wt %, in further embodiments from about 60 wt % to about 99.5 wt %, and in even further embodiments, from about 75 wt % to about 99 wt % of the thermoplastic composition.

In other embodiments, additional polymer(s) may constitute from greater than about 50 wt %, in particular embodiments from about 50 wt % to about 99 wt %, in selected embodiments from about 55 wt % to about 99 wt %, in further embodiments from about 55 wt % to about 95 wt %, and in even further embodiments from about 65 wt % to about 95 wt %. Likewise, the above described propylene/α-olefin copolymer may constitute from less than about 49 wt %, in particular embodiments from about 1 wt % to about 49 wt %, in selected embodiments from about 1 wt % to about 45 wt %, in further embodiments from about 5 wt % to about 45 wt %, and in even further embodiments, from about 5 wt % to about 35 wt % of the thermoplastic composition.

The thermoplastic composition used to form the meltblown fibers may also contain other additives as is known in the art, such as melt stabilizers, processing stabilizers, heat stabilizers, light stabilizers, antioxidants, heat aging stabilizers, whitening agents, etc. Phosphite stabilizers (e.g., IRGAFOS available from Ciba Specialty Chemicals of Tarrytown, N.Y. and DOVERPHOS available from Dover Chemical Corp. of Dover, Ohio) are exemplary melt stabilizers. In addition, hindered amine stabilizers (e.g., CHIMASSORB available from Ciba Specialty Chemicals) are exemplary heat and light stabilizers. Further, hindered phenols are commonly used as an antioxidant. Some suitable hindered phenols include those available from Ciba Specialty Chemicals of under the trade name "Irganox®", such as Irganox® 1076, 1010, or E 201. When employed, such additives (e.g., antioxidant, stabilizer, etc.) may each be present in an amount from about 0.001 wt % to about 15 wt %, in further embodiments, from about 0.005 wt % to about 10 wt %, and in even further embodiments, from 0.01 wt % to about 5 wt % of the thermoplastic composition used to form the meltblown fibers.

Through the selection of certain polymers and their content, the resulting thermoplastic composition may possess thermal properties superior to polypropylene homopolymers conventionally employed in meltblown webs. For example, the thermoplastic composition is generally more amorphous in nature than polypropylene homopolymers conventionally employed in meltblown webs. For this reason, the rate of crystallization of the thermoplastic composition is slower, as measured by its "crystallization half-time"—i.e., the time required for one-half of the material to become crystalline. For example, the thermoplastic composition typically has a crystallization half-time of greater than about 5 minutes, in further embodiments from about 5.25 minutes to about 20 minutes, and in even further embodiments, from about 5.5 minutes to about 12 minutes, determined at a temperature of 125° C. To the contrary, conventional polypropylene homopolymers often have a crystallization half-time of 5 minutes or less. Further, the thermoplastic composition may have a melting temperature ("$T_m$") of from about 100° C. to about 250° C., in further embodiments from about 110° C. to about 200° C., and in even further embodiments, from about 140° C. to about 180° C. The thermoplastic composition may also have a crystallization temperature ("$T_c$") (determined at a cooling rate of 10° C./min) of from about 50° C. to about 150° C., in further embodiments from about 80° C. to about 140° C., and in even further embodiments, from about 100° C. to about 120° C. The crystallization half-time, melting temperature, and crystallization temperature may be determined using differential scanning calorimetry ("DSC") as is well known to those skilled in the art and described in more detail below.

The melt flow rate of the thermoplastic composition may also be selected within a certain range to optimize the properties of the resulting meltblown fibers. The melt flow rate is the weight of a polymer (in grams) that may be forced through an extrusion rheometer orifice (0.0825-inch diameter) when subjected to a force of 2160 grams in 10 minutes at 230° C. Generally speaking, the melt flow rate is high enough to improve melt processability, but not so high as to adversely interfere with the binding properties of the fibers to the absorbent material. Thus, in most embodiments, the thermoplastic composition has a melt flow rate of from about 120 to about 6000 grams per 10 minutes, in further embodiments from about 150 to about 3000 grams per 10 minutes, and in even further embodiments, from about 170 to about 1500 grams per 10 minutes, measured in accordance with ASTM Test Method D1238-E.

II. Meltblown Fibers

The meltblown fibers may constitute from about 2 wt % to about 40 wt %, in further embodiments from 4 wt % to about 30 wt %, and in even further embodiments, from about 5 wt % to about 20 wt % of the coform web. The meltblown fibers may be monocomponent or multicomponent. Monocomponent fibers are generally formed from a polymer or blend of polymers extruded from a single extruder. Multicomponent fibers are generally formed from two or more polymers (e.g., bicomponent fibers) extruded from separate extruders. The polymers may be arranged in substantially constantly positioned distinct zones across the cross-section of the fibers. The components may be arranged in any desired configuration, such as sheath-core, side-by-side, pie, island-in-the-sea, three island, bull's eye, or various other arrangements known in the art. Various methods for forming multicomponent fibers are described in U.S. Pat. No. 4,789,592 to Taniguchi et al. and U.S. Pat. No. 5,336,552 to Strack et al., U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference thereto for all purposes. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference thereto for all purposes.

III. Absorbent Material

Any absorbent material may generally be employed in the coform nonwoven web, such as absorbent fibers, particles, etc. The absorbent material may constitute from about 60 wt % to about 98 wt %, in further embodiments from 70 wt % to about 96 wt %, and in even further embodiments, from about 80 wt % to about 95 wt % of the coform web. In one embodiment, the absorbent material includes fibers formed by a variety of pulping processes, such as kraft pulp, sulfite pulp, thermomechanical pulp, etc. The pulp fibers may include softwood fibers having an average fiber length of greater than 1 mm and particularly from about 2 to 5 mm based on a length-weighted average. Such softwood fibers can include, but are not limited to, northern softwood, southern softwood, redwood, red cedar, hemlock, pine (e.g., southern pines), spruce (e.g., black spruce), combinations thereof, and so forth. Exemplary commercially available pulp fibers suitable for use include those available from Weyerhaeuser Co. of Federal Way, Wash. under the designation "Weyco CF-405." Hardwood fibers, such as eucalyptus, maple, birch, aspen, and so forth, can also be used. In certain instances, eucalyptus fibers may be particularly desired to increase the softness of the web. Eucalyptus fibers can also enhance the brightness, increase the opacity, and change the pore structure of the web to increase its wicking ability. Moreover, if desired, secondary fibers obtained from recycled materials may be used, such as fiber pulp from sources such as, for example, newsprint, reclaimed paperboard, and office waste. Further, other natural fibers can also be used, such as abaca, sabai grass, milkweed floss, pineapple leaf, and so forth. In addition, in some instances, synthetic fibers can also be utilized.

Besides or in conjunction with pulp fibers, the absorbent material may also include a superabsorbent that is in the form fibers, particles, gels, etc. Generally speaking, superabsorbents are water-swellable materials capable of absorbing at least about 20 times its weight and, in some cases, at least about 30 times its weight in an aqueous solution containing 0.9 weight percent sodium chloride. The superabsorbent may be formed from natural, synthetic and modified natural polymers and materials. Examples of synthetic superabsorbent polymers include the alkali metal and ammonium salts of poly(acrylic acid) and poly(methacrylic acid), poly(acrylamides), poly(vinyl ethers), maleic anhydride copolymers with vinyl ethers and alpha-olefins, poly(vinyl pyrrolidone), poly(vinylmorpholinone), poly(vinyl alcohol), and mixtures and copolymers thereof. Further, superabsorbents include natural and modified natural polymers, such as hydrolyzed acrylonitrile-grafted starch, acrylic acid grafted starch, methyl cellulose, chitosan, carboxymethyl cellulose, hydroxypropyl cellulose, and the natural gums, such as alginates, xanthan gum, locust bean gum and so forth. Mixtures of natural and wholly or partially synthetic superabsorbent polymers may also be used. Particularly suitable superabsorbent polymers are HYSORB 8800AD (BASF of Charlotte, N.C. and FAVOR SXM 9300 (available from Evonik Stockhausen of Greensboro, N.C.).

IV. Coform Technique

The coform web is generally made by a process in which at least one meltblown die head (e.g., two) is arranged near a chute through which the absorbent material is added while the web forms. Some examples of such coform techniques are disclosed in U.S. Pat. No. 4,100,324 to Anderson, et al.; U.S. Pat. No. 5,350,624 to Georger, et al.; and U.S. Pat. No. 5,508,102 to Georger, et al., as well as U.S. Patent Application Publication Nos. 2003/0200991 to Keck, et al. 2007/0049153 to Dunbar, et al., and 2009/0233072 to Harvey et al., all of which are incorporated herein in their entirety by reference thereto for all purposes.

Figure 1:
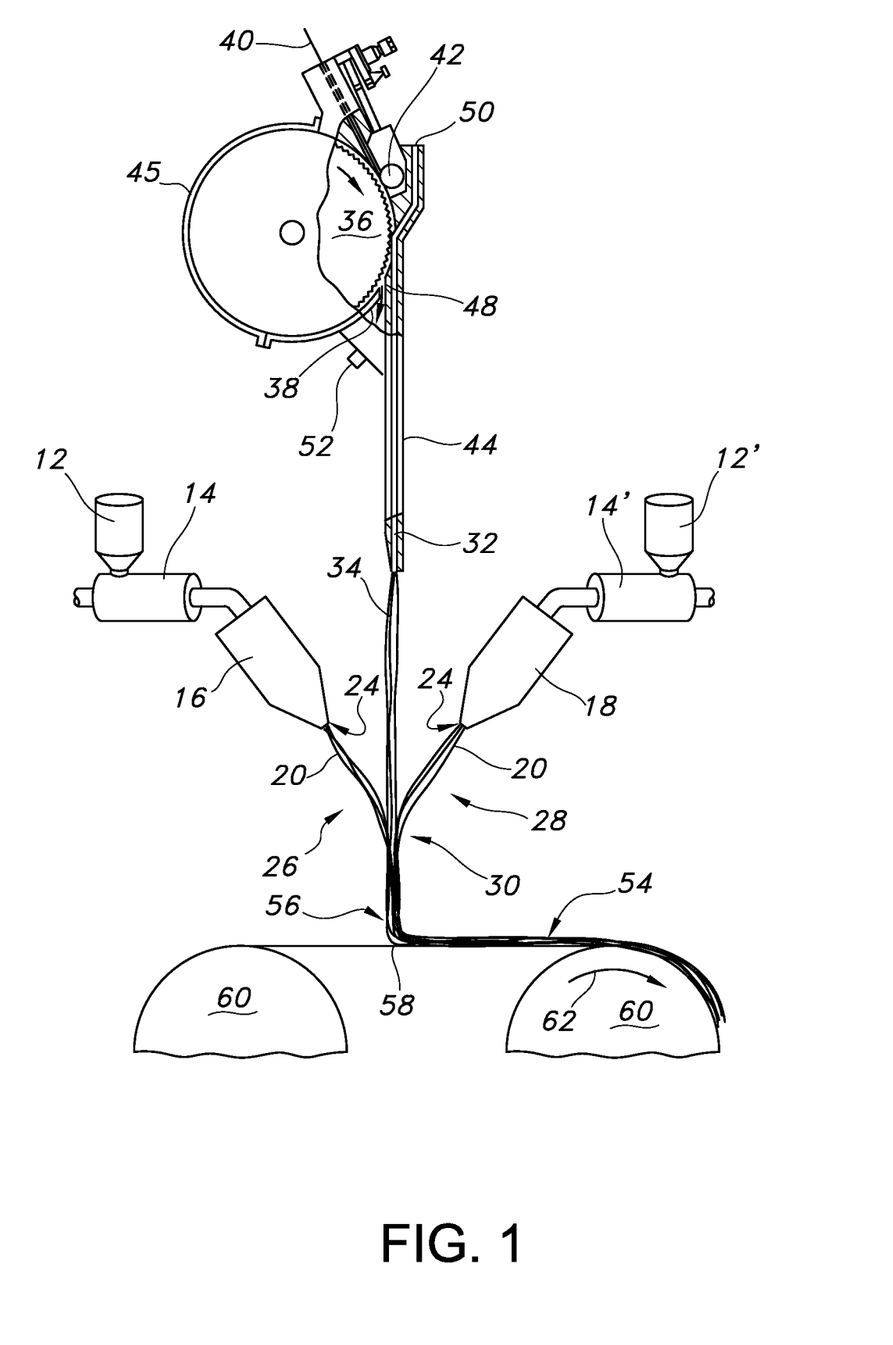
FIG. 1 is a schematic illustration one embodiment of a method for forming the coform web of the present invention.

Referring to FIG. 1, for example, one embodiment of an apparatus is shown for forming a coform web. In this embodiment, the apparatus includes a pellet hopper 12 or 12' of an extruder 14 or 14', respectively, into which a propylene/$\alpha$-olefin thermoplastic composition may be introduced. The extruders 14 and 14' each have an extrusion screw (not shown), which is driven by a conventional drive motor (not shown). As the polymer advances through the extruders 14 and 14', it is progressively heated to a molten state due to rotation of the extrusion screw by the drive motor. Heating may be accomplished in a plurality of discrete steps with its temperature being gradually elevated as it advances through discrete heating zones of the extruders 14 and 14' toward two meltblowing dies 16 and 18, respectively. The meltblowing dies 16 and 18 may be yet another heating zone where the temperature of the thermoplastic resin is maintained at an elevated level for extrusion.

When two or more meltblowing die heads are used, such as described above, it should be understood that the fibers produced from the individual die heads may be different types of fibers. That is, one or more of the size, shape, or polymeric composition may differ, and furthermore the fibers may be monocomponent or multicomponent fibers. For example, larger fibers may be produced by the first meltblowing die head, such as those having an average diameter of about 10 micrometers or more, in further embodiments about 15 micrometers or more, and in even further embodiments, from about 20 to about 50 micrometers, while smaller fibers may be produced by the second die head, such as those having an average diameter of about 10 micrometers or less, in further embodiments about 7 micrometers or less, and in even further embodiments, from about 2 to about 6 micrometers. In addition, it may be desirable that each die head extrude approximately the same amount of polymer such that the relative percentage of the basis weight of the coform nonwoven web material resulting from each meltblowing die head is substantially the same. Alternatively, it may also be desirable to have the relative basis weight production skewed, such that one die head or the other is responsible for the majority of the coform web in terms of basis weight. As a specific example, for a meltblown fibrous nonwoven web material having a basis weight of 1.0 ounces per square yard or "osy" (34 grams per square meter or "gsm"), it may be desirable for the first meltblowing die head to produce about 30 percent of the basis weight of the meltblown fibrous nonwoven web material, while one or more subsequent meltblowing die heads produce the remainder 70 percent of the basis weight of the meltblown fibrous nonwoven web material. Generally speaking, the overall basis weight of the coform nonwoven web is from about 10 gsm to about 350 gsm, and more particularly from about 17 gsm to about 200 gsm, and still more particularly from about 25 gsm to about 150 gsm.

Figure 2:
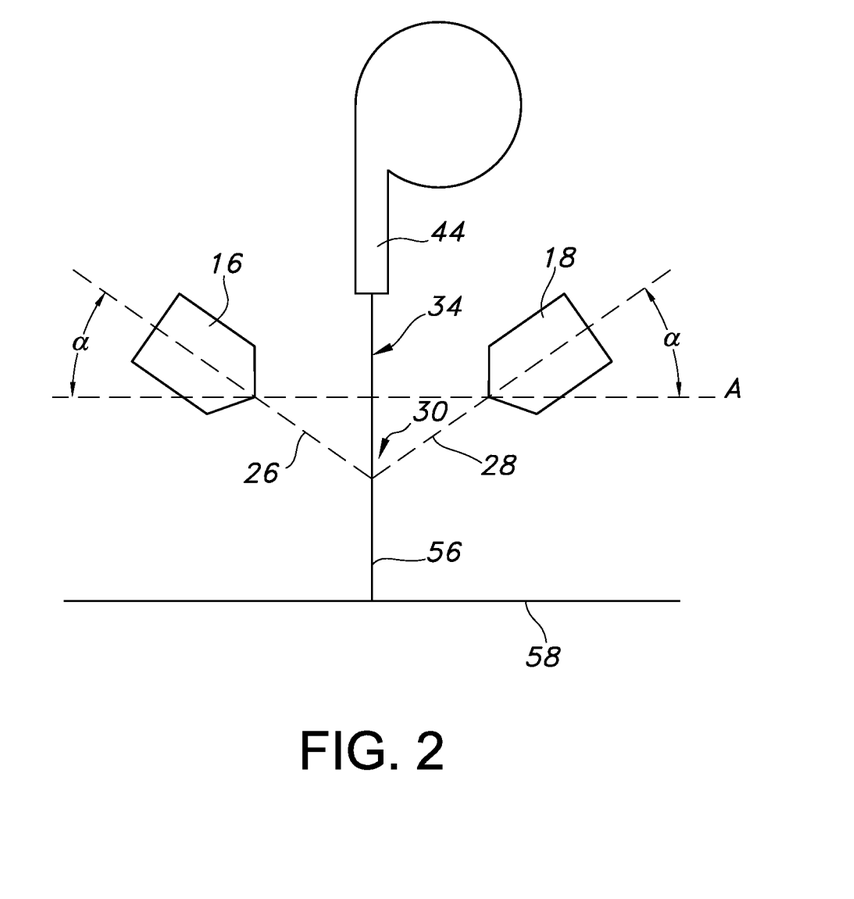
FIG. 2 is an illustration of certain features of the apparatus shown in FIG. 1.

Each meltblowing die 16 and 18 is configured so that two streams of attenuating gas per die converge to form a single stream of gas which entrains and attenuates molten threads 20 as they exit small holes or orifices 24 in each meltblowing die. The molten threads 20 are formed into fibers or, depending upon the degree of attenuation, microfibers, of a small diameter which is usually less than the diameter of the orifices 24. Thus, each meltblowing die 16 and 18 has a corresponding single stream of gas 26 and 28 containing entrained thermoplastic polymer fibers. The gas streams 26 and 28 containing polymer fibers are aligned to converge at an impingement zone 30. Typically, the meltblowing die heads 16 and 18 are arranged at a certain angle with respect to the forming surface, such as described in U.S. Pat. Nos. 5,508,102 and 5,350,624 to Georger et al. Referring to FIG. 2, for example, the meltblown dies 16 and 18 may be oriented at an angle α as measured from a plane "A" tangent to the two dies 16 and 18. As shown, the plane "A" is generally parallel to the forming surface 58 (FIG. 1). Typically, each die 16 and 18 is set at an angle ranging from about 30 to about 75 degrees, in further embodiments from about 35° to about 60°, and in even further embodiments from about 45° to about 55°. The dies 16 and 18 may be oriented at the same or different angles. In fact, the texture of the coform web may actually be enhanced by orienting one die at an angle different than another die.

Referring again to FIG. 1, absorbent fibers 32 (e.g., pulp fibers) are added to the two streams 26 and 28 of thermoplastic polymer fibers 20 and 21, respectively, and at the impingement zone 30. Introduction of the absorbent fibers 32 into the two streams 26 and 28 of thermoplastic polymer fibers 20 and 21, respectively, is designed to produce a graduated distribution of absorbent fibers 32 within the combined streams 26 and 28 of thermoplastic polymer fibers. This may be accomplished by merging a secondary gas stream 34 containing the absorbent fibers 32 between the two streams 26 and 28 of thermoplastic polymer fibers 20 and 21 so that all three gas streams converge in a controlled manner. Because they remain relatively tacky and semi-molten after formation, the meltblown fibers 20 and 21 may simultaneously adhere and entangle with the absorbent fibers 32 upon contact therewith to form a coherent nonwoven structure.

To accomplish the merger of the fibers, any conventional equipment may be employed, such as a picker roll 36 arrangement having a plurality of teeth 38 adapted to separate a mat or batt 40 of absorbent fibers into the individual absorbent fibers. When employed, the sheets or mats 40 of fibers 32 are fed to the picker roll 36 by a roller arrangement 42. After the teeth 38 of the picker roll 36 have separated the mat of fibers into separate absorbent fibers 32, the individual fibers are conveyed toward the stream of thermoplastic polymer fibers through a nozzle 44. A housing 46 encloses the picker roll 36 and provides a passageway or gap 48 between the housing 46 and the surface of the teeth 38 of the picker roll 36. A gas, for example, air, is supplied to the passageway or gap 48 between the surface of the picker roll 36 and the housing 46 by way of a gas duct 50. The gas duct 50 may enter the passageway or gap 48 at the junction 52 of the nozzle 44 and the gap 48. The gas is supplied in sufficient quantity to serve as a medium for conveying the absorbent fibers 32 through the nozzle 44. The gas supplied from the duct 50 also serves as an aid in removing the absorbent fibers 32 from the teeth 38 of the picker roll 36. The gas may be supplied by any conventional arrangement such as, for example, an air blower (not shown). It is contemplated that additives and/or other materials may be added to or entrained in the gas stream to treat the absorbent fibers. The individual absorbent fibers 32 are typically conveyed through the nozzle 44 at about the velocity at which the absorbent fibers 32 leave the teeth 38 of the picker roll 36. In other words, the absorbent fibers 32, upon leaving the teeth 38 of the picker roll 36 and entering the nozzle 44, generally maintain their velocity in both magnitude and direction from the point where they left the teeth 38 of the picker roll 36. Such an arrangement, which is discussed in more detail in U.S. Pat. No. 4,100,324 to Anderson, et al.

If desired, the velocity of the secondary gas stream 34 may be adjusted to achieve coform structures of different properties. For example, when the velocity of the secondary gas stream is adjusted so that it is greater than the velocity of each stream 26 and 28 of thermoplastic polymer fibers 20 and 21 upon contact at the impingement zone 30, the absorbent fibers 32 are incorporated in the coform nonwoven web in a gradient structure. That is, the absorbent fibers 32 have a higher concentration between the outer surfaces of the coform nonwoven web than at the outer surfaces. On the other hand, when the velocity of the secondary gas stream 34 is less than the velocity of each stream 26 and 28 of thermoplastic polymer fibers 20 and 21 upon contact at the impingement zone 30, the absorbent fibers 32 are incorporated in the coform nonwoven web in a substantially homogenous fashion. That is, the concentration of the absorbent fibers is substantially the same throughout the coform nonwoven web. This is because the low-speed stream of absorbent fibers is drawn into a high-speed stream of thermoplastic polymer fibers to enhance turbulent mixing which results in a consistent distribution of the absorbent fibers.

To convert the composite stream 56 of thermoplastic polymer fibers 20, 21 and absorbent fibers 32 into a coform nonwoven structure 54, a collecting device is located in the path of the composite stream 56. The collecting device may be a forming surface 58 (e.g., belt, drum, wire, fabric, etc.) driven by rollers 60 and that is rotating as indicated by the arrow 62 in FIG. 1. The merged streams of thermoplastic polymer fibers and absorbent fibers are collected as a coherent matrix of fibers on the surface of the forming surface 58 to form the coform nonwoven web 54. If desired, a vacuum box (not shown) may be employed to assist in drawing the near molten meltblown fibers onto the forming surface 58. The resulting textured coform structure 54 is coherent and may be removed from the forming surface 58 as a self-supporting nonwoven material.

It should be understood that the present invention is by no means limited to the above-described embodiments. In an alternative embodiment, for example, first and second meltblowing die heads may be employed that extend substantially across a forming surface in a direction that is substantially transverse to the direction of movement of the forming surface. The die heads may likewise be arranged in a substantially vertical disposition, i.e., perpendicular to the forming surface, so that the thus-produced meltblown fibers are blown directly down onto the forming surface. Such a configuration is well known in the art and described in more detail in, for instance, U.S. Patent Application Publication No. 2007/0049153 to Dunbar, et al. Furthermore, although the above-described embodiments employ multiple meltblowing die heads to produce fibers of differing sizes, a single die head may also be employed. An example of such a process is described, for instance, in U.S. Patent Application Publication No. 2005/0136781 to Lassig, et al., which is incorporated herein in its entirety by reference thereto for all purposes.

As indicated above, it is desired in certain cases to form a coform web that is textured. Referring again to FIG. 1, for example, one embodiment employs a forming surface 58 that is foraminous in nature so that the fibers may be drawn through the openings of the surface and form dimensional cloth-like tufts projecting from the surfaces of the material that correspond to the openings in the forming surface 58. The foraminous surface may be provided by any material that provides sufficient openings for penetration by some of the fibers, such as a highly permeable forming wire. Wire weave geometry and processing conditions may be used to alter the texture or tufts of the material. The particular choice will depend on the desired peak size, shape, depth, surface tuft "density" (that is, the number of peaks or tufts per unit area), etc. In one embodiment, for example, the wire may have an open area of from about 35% and about 65%, in further embodiments from about 40% to about 60%, and in even further embodiments, from about 45% to about 55%. One exemplary high open area forming surface is the forming wire FORMTECH™ 6 manufactured by Albany International Co. of Albany, N.Y. Such a wire has a "mesh count" of about six strands by six strands per square inch (about 2.4 by 2.4 strands per square centimeter), i.e., resulting in about 36 foramina or "holes" per square inch (about 5.6 per square centimeter), and therefore capable of forming about 36 tufts or peaks in the material per square inch (about 5.6 peaks per square centimeter). The FORMTECH™ 6 wire also has a warp diameter of about 1 millimeter polyester, a shute diameter of about 1.07 millimeters polyester, a nominal air permeability of approximately 41.8 m$^3$/min (1475 ft$^3$/min), a nominal caliper of about 0.2 centimeters (0.08 inch) and an open area of approximately 51%. Another exemplary forming surface available from the Albany International Co. is the forming wire FORMTECH™10, which has a mesh count of about 10 strands by 10 strands per square inch (about 4 by 4 strands per square centimeter), i.e., resulting in about 100 foramina or "holes" per square inch (about 15.5 per square centimeter), and therefore capable of forming about 100 tufts or peaks per square inch (about 15.5 peaks per square centimeter) in the material. Still another suitable forming wire is FORMTECH™ 8, which has an open area of 47% and is also available from Albany International. Of course, other forming wires and surfaces (e.g., drums, plates, mats, etc.) may be employed. For examples, mats may be used with a depressions engraved in the surface such that the coform fibers will fill the depressions to result in tufts that correspond with the depressions. The depressions (tufts) may take on various shapes, including, but not limited to, circles, squares, rectangles, swirls, ribs, lines, clouds, and so forth. Also, surface variations may include, but are not limited to, alternate weave patterns, alternate strand dimensions, release coatings (e.g., silicones, fluorochemicals, etc.), static dissipation treatments, and the like. Still other suitable foraminous surfaces that may be employed are described in U.S. Patent Application Publication No. 2007/0049153 to Dunbar, et al.

Regardless of the particular texturing method employed, the tufts formed by the meltblown fibers including a propylene/α-olefin copolymer are better able to retain the desired shape and surface contour. Namely, because the meltblown fibers crystallize at a relatively slow rate, they are soft upon deposition onto the forming surface, which allows them to drape over and conform to the contours of the surface. After the fibers crystallize, they are then able to hold the shape and form tufts. The size and shape of the resulting tufts depends upon the type of forming surface used, the types of fibers deposited thereon, the volume of below wire air vacuum used to draw the fibers onto and into the forming surface, and other related factors. For example, the tufts may project from the surface of the material in the range of about 0.25 millimeters to at least about 9.0 millimeters, and in further embodiments, from about 0.5 millimeters to about 3 millimeters. Generally speaking, the tufts are filled with fibers and thus have desirable resiliency useful for wiping and scrubbing.

Figure 3:
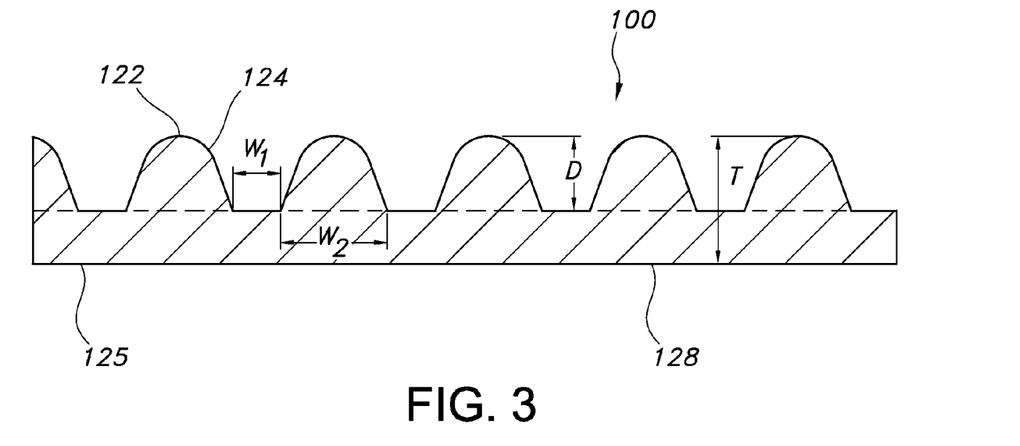
FIG. 3 is a cross-sectional view of one embodiment of a textured coform nonwoven web formed according to the present invention.
Figure 4:
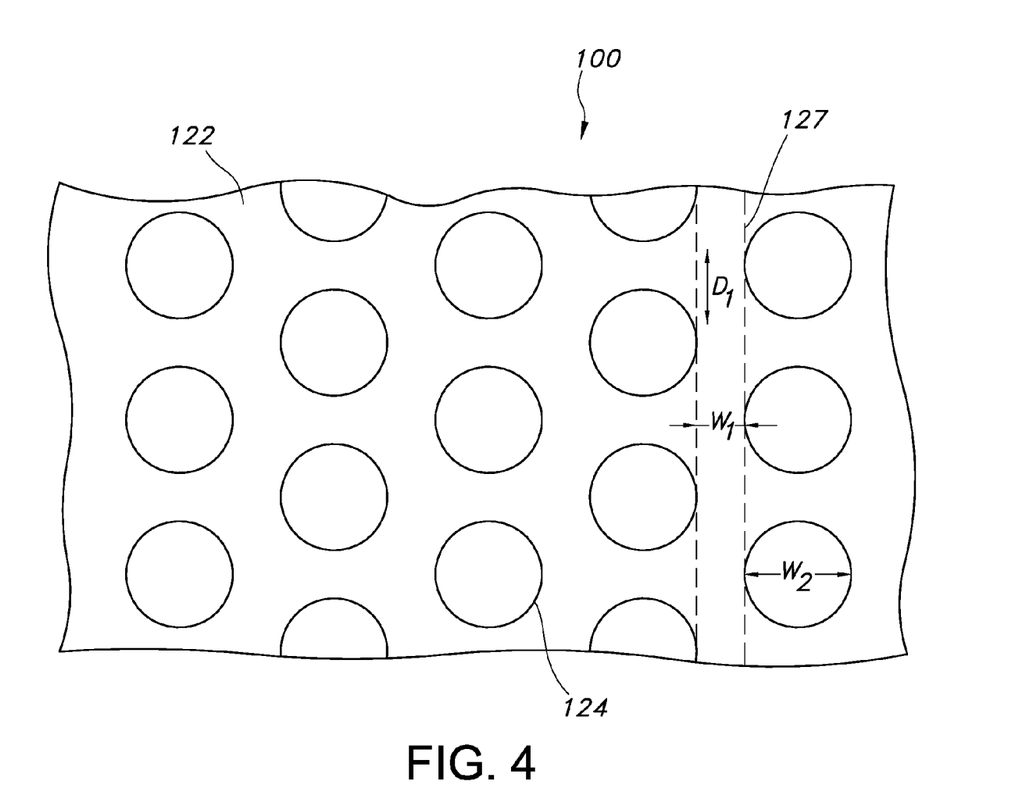
FIG. 4 is a plan view of a forming surface useful for forming the coform web of the present invention.

Referring to FIGS. 3 and 4, a textured coform web 100 has a first exterior surface 122 and a second exterior surface 128. At least one of the exterior surfaces has a three-dimensional surface texture. In FIG. 3, for instance, the first exterior surface 122 has a three-dimensional surface texture that includes tufts, peaks, or offset regions 124 extending upwardly from a continuous region 125 that extends continuously in the machine and cross directions of the coform web 100. In a particular embodiment, the density of the continuous region may be substantially equal to the density of the offset regions. One indication of the magnitude of three-dimensionality in the textured exterior surface(s) of the coform web is the peak to valley ratio, which is calculated as the ratio of the overall thickness "T" divided by the valley depth "D." When textured, the coform web typically has a peak to valley ratio of about 5 or less, in further embodiments from about 0.1 to about 4, and in even further embodiments, from about 0.5 to about 3. The continuous region 125 may have a thickness (T-D) ranging from about 0.01 millimeters to about 10.0 millimeters, desirably ranging from about 0.02 to about 6.0 millimeters, and more desirably ranging from about 0.03 to about 3.0 millimeters. In a particular embodiment, the basis weight and/or thickness (T-D) of the continuous region may be less than the basis weight and/or thickness (D) of the offset regions.

In particular embodiments that are more densely textured, the textured coform web will have from about 2 to about 70 tufts per square centimeter, and in other embodiments, from about 5 to about 50 tufts per square centimeter. In certain embodiments that are less densely textured, the textured coform web will have from about 100 to about 20,000 tufts per square meter, and in further embodiments will have from about 200 to about 10,000 tufts per square meter. The textured coform web may also exhibit a three-dimensional texture on the second surface of the web. This will especially be the case for lower basis weight materials, such as those having a basis weight of less than about 70 grams per square meter due to "mirroring", wherein the second surface of the material exhibits peaks offset or between peaks on the first exterior surface of the material. In this case, the valley depth D is measured for both exterior surfaces as above and are then added together to determine an overall material valley depth.

Referring again to FIGS. 3 and 4, in particular embodiments the continuous region 125 comprises a plurality of uninterrupted regions 127 that extend continuously in at least one direction "$D_1$" without intersecting an offset region 124. Another indication of the magnitude of the three dimensionality of the texture is the ratio of the width "$W_1$" of the uninterrupted region 127 (measured as the largest width of the uninterrupted region in the direction perpendicular to the direction $D_1$ in which the uninterrupted region 127 extends without intersecting an offset region) to the width "$W_2$" of the offset regions 124 (measured as the largest dimension of the offset regions in the direction perpendicular to the direction $D_1$). In particular embodiments $W_1$ may be in a range from about 0.01 inches to about 0.75 inches, desirably in a range from about 0.05 inches to about 0.5 inches, and more desirably in a range from about 0.08 inches to about 0.3 inches. In particular embodiments, the ratio $W_1/W_2$ may be in a range from about 0.3 to about 3.0, desirably in a range from about 0.5 to about 2.0, and more desirably in a range from about 0.7 to about 1.5. In particular embodiments there may additionally be a plurality of second uninterrupted regions that extend continuously in a second direction "$D_2$" without intersecting an offset region. In a particular embodiment, $D_2$ may be perpendicular to $D_1$, but other angles may also be used. The dimensions of the second uninterrupted regions in relation to the dimensions of the offset regions may be as described above for the first uninterrupted regions.

V. Articles

The coform nonwoven web may be used in a wide variety of articles. For example, the web may be incorporated into an "absorbent article" that is capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, mitt wipe, and so forth; medical absorbent articles, such as garments, fenestration materials, underpads, bedpads, bandages, absorbent drapes, and medical wipes; food service wipers; clothing articles; pouches; and so forth. Materials and processes suitable for forming such articles are well known to those skilled in the art.

In one particular embodiment, the coform web is used to form a wipe. The wipe may be formed entirely from the coform web or it may contain other materials, such as films, nonwoven webs (e.g., spunbond webs, meltblown webs, carded web materials, other coform webs, airlaid webs, etc.), paper products, and so forth. In one embodiment, for example, two layers of a textured coform web may be laminated together to form the wipe, such as described in U.S. Patent Application Publication No. 2007/0065643 to Kopacz, which is incorporated herein in its entirety by reference thereto for all purposes. In such embodiments, one or both of the layers may be formed from the coform web. In another embodiment, it may be desired to provide a certain amount of separation between a user's hands and a moistening or saturating liquid that has been applied to the wipe, or, where the wipe is provided as a dry wiper, to provide separation between the user's hands and a liquid spill that is being cleaned up by the user. In such cases, an additional nonwoven web or film may be laminated to a surface of the coform web to provide physical separation and/or provide liquid barrier properties. Other fibrous webs may also be included to increase absorbent capacity, either for the purposes of absorbing larger liquid spills, or for the purpose of providing a wipe a greater liquid capacity. When employed, such additional materials may be attached to the coform web using any method known to one skilled in the art, such as by thermal or adhesive lamination or bonding with the individual materials placed in face to face contacting relation. Regardless of the materials or processes utilized to form the wipe, the basis weight of the wipe is typically from about 20 to about 200 grams per square meter (gsm), and in further embodiments, between about 35 to about 100 gsm. Lower basis weight products may be particularly well suited for use as light duty wipes, while higher basis weight products may be better adapted for use as industrial wipes.

The wipe may assume a variety of shapes, including but not limited to, generally circular, oval, square, rectangular, or irregularly shaped. Each individual wipe may be arranged in a folded configuration and stacked one on top of the other to provide a stack of wet wipes. Such folded configurations are well known to those skilled in the art and include c-folded, z-folded, quarter-folded configurations and so forth. For example, the wipe may have an unfolded length of from about 2.0 to about 80.0 centimeters, and in further embodiments, from about 10.0 to about 25.0 centimeters. The wipes may likewise have an unfolded width of from about 2.0 to about 80.0 centimeters, and in further embodiments, from about 10.0 to about 25.0 centimeters. The stack of folded wipes may be placed in the interior of a container, such as a plastic tub, to provide a package of wipes for eventual sale to the consumer. Alternatively, the wipes may include a continuous strip of material which has perforations between each wipe and which may be arranged in a stack or wound into a roll for dispensing. Various suitable dispensers, containers, and systems for delivering wipes are described in U.S. Pat. No. 5,785,179 to Buczwinski, et al.; U.S. Pat. No. 5,964,351 to Zander; U.S. Pat. No. 6,030,331 to Zander; U.S. Pat. No. 6,158,614 to Haynes, et al.; U.S. Pat. No. 6,269,969 to Huang, et al.; U.S. Pat. No. 6,269,970 to Huang, et al.; and U.S. Pat. No. 6,273,359 to Newman, et al., which are incorporated herein in their entirety by reference thereto for all purposes.

In certain embodiments, the wipe is a "wet" or "premoistened" wipe in that it contains a liquid solution for cleaning, disinfecting, sanitizing, etc. The particular liquid solutions are not critical and are described in more detail in U.S. Pat. No. 6,440,437 to Krzysik, et al.; U.S. Pat. No. 6,028,018 to Amundson, et al.; U.S. Pat. No. 5,888,524 to Cole; U.S. Pat. No. 5,667,635 to Win, et al.; and U.S. Pat. No. 5,540,332 to Kopacz, et al., which are incorporated herein in their entirety by reference thereto for all purposes. The amount of the liquid solution employed may depending upon the type of wipe material utilized, the type of container used to store the wipes, the nature of the cleaning formulation, and the desired end use of the wipes. Generally, each wipe contains from about 150 to about 600 wt % and desirably from about 300 to about 500 wt % of a liquid solution based on the dry weight of the wipe.

A measure of the flexibility of a nonwoven structure or wipe is the Cup Crush Energy/Thickness ratio. Cup Crush Energy, measured as defined below, is a measure of the amount of energy required to crush a material that has been formed into the shape of a cup for the purpose below. A low value of Cup Crush Energy is indicative of a highly flexible material. Thicker materials are desirable because more thickness means lower density, better absorbency, and better cushioning and softness. Therefore, nonwoven structures demonstrating lower Cup Crush Energy/Thickness ratios are desirable. Coform webs desirably have a Cup Crush Energy/Thickness ratio of less than 600 grams. In various embodiments, the coform webs and wipes may have a Cup Crush Energy/Thickness ratio in a range selected from the ranges consisting of from about 200 grams to about 600 grams, from about 250 grams to about 600 grams, from about 276 grams to about 600 grams, from about 200 grams to about 580 grams, from about 250 grams to about 580 grams, from about 276 grams to about 580 grams, from about 200 grams to about 500 grams, from about 250 grams to about 500 grams, from about 276 grams to about 500 grams, from about 200 grams to about 400 grams, from about 250 grams to about 400 grams, from about 276 grams to about 400 grams, from about 200 grams to about 380 grams, from about 250 grams to about 380 grams, and from about 276 grams to about 380 grams.

The present invention may be better understood with reference to the following examples.

Test Methods

Figure 5:
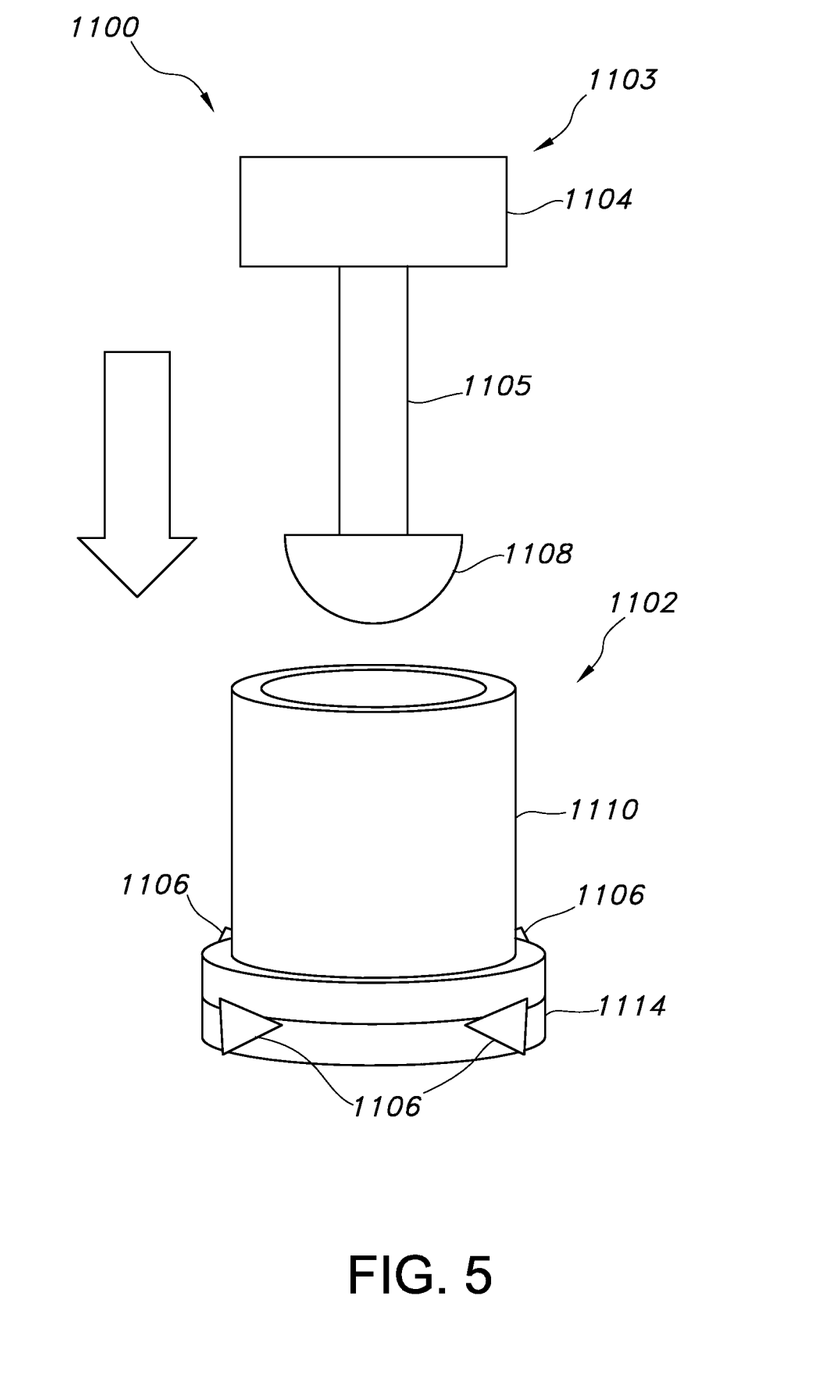
FIG. 5 is a schematic view of a load testing apparatus for testing a composite according to the present invention.
Figure 6:
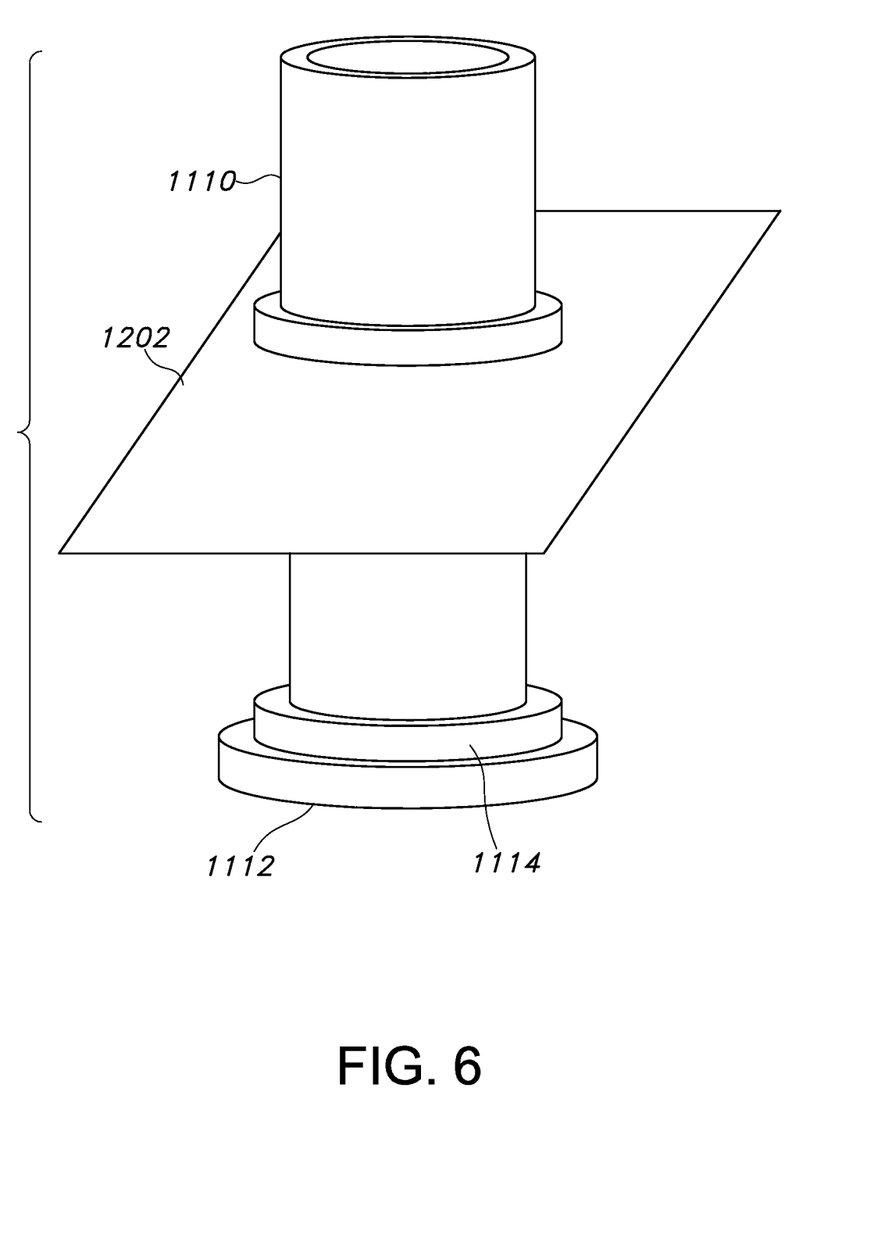
FIG. 6 is an exploded view of FIG. 5.

Cup Crush:

FIGS. 5 and 6 show a cup-crush testing system 1100 which includes a cup forming assembly 1102 and force testing unit 1103. The force testing unit 1103 includes a force sensor 1104 to which is cantilevered a rigid rod 1105. A hemispherical foot 1108 is positioned at the free end of rod 1105. Force sensor 1104 includes electronics and mechanics for measuring the force experienced at foot 1108 and transferred through rigid rod 1105. The assembly 1102 includes mating, top-hat shaped former cups 1110 and 1112, which grip a sheet 1202, at least four points. The four corners 1106 of sheet 1202 extend outside of the assembly 1102. The cup 1112 is removed after forming sheet 1202 into a cup. A gripping ring 1114 holds the formed sheet 1202 in cup 1110 during testing.

One measure of the softness of a non-woven fabric sheet 1202 is determined according to the "cup crush" test by system 1100. The cup crush test evaluates fabric stiffness by measuring the peak load (also called the "cup crush load" or just "cup crush") required for a 4.5 cm diameter hemispherically shaped foot 1108 to crush a 17.8 cm by 17.8 cm piece of fabric 1202 shaped into an approximately 6.5 cm diameter by 6.5 cm tall cup shape, while the now cup shaped fabric is surrounded by an approximately 6.5 cm diameter cylinder cup 1110 to maintain a uniform deformation of the cup shaped fabric 1102. There can be gaps between the ring 1114 and forming cup 1110, but at least four corners 1106 must be fixedly pinched therebetween. The foot 1108 and cylinder cup 1110 are aligned to avoid contract between the cup walls and the foot that could affect the readings. The load is measured in grams, and recorded a minimum of twenty times per second while the foot is descending at a rate of about 406 mm per minute. The cup crush test provides a value for the total energy required to crush a sample (the "cup crush energy") which is the energy over a 4.5 cm range beginning 0.5 cm below the top of the fabric cup, i.e., the area under the curve formed by the load in grams on one axis and the distance the foot travels in millimeters on the other. Cup crush energy is generally reported in gm-mm (or inch-pounds). Cup crush peak load is determined over the same distance of foot travel as the energy, and is generally reported in grams or pounds. A lower cup crush value (peak load or energy) indicates a softer material. A suitable device for measuring cup crush is a model FTD-G-500 load cell (500 gram range) available from the Schaevitz Company, Pennsauken, N.J. Wet samples are tested with 270% liquid add-on.

Caliper/Thickness:

The caliper of the coform materials is a measure of thickness. The thickness is measured at 0.05 psi with a standard fabric bulk/thickness tester, in units of millimeters using a 7.62 cm (3 in) diameter platen. This test is conducted on the finished wet-wipe product and care must be taken to insure the platen does not fall on a fold or wrinkle that has resulted from packaging. Wet samples are measured with 270% liquid add-on.

EXAMPLES

General Conditions for all Coform Samples

Various samples of coform webs were formed from two heated streams of meltblown fibers and a single stream of fiberized pulp fibers as described above and shown in FIG. 1. The pulp fibers were fully treated southern softwood pulp obtained from the Weyerhaeuser Co. of Federal Way, Wash. under the designation "CF-405." The polymer of each meltblown stream was supplied to respective meltblown dies at a rate of 2.0 pounds of polymer per inch of die tip per hour at 470° F. melt temperature. The distance from the impingement zone to the forming wire (i.e., the forming height) was approximately 8 inches and the distance between the tips of the meltblown dies was approximately 5 inches. The meltblown die positioned upstream from the pulp fiber stream was oriented at an angle of 45° relative to the pulp stream, while the other meltblown die (positioned downstream from the pulp stream) was oriented about 45° relative to the pulp stream. The samples had a basis weight of 70 grams per square meter (gsm) and a meltblown fiber content of 30 wt %. The forming wire was FORMTECH™ 8 (Albany International Co.). To achieve different types of tufts, rubber mats were disposed on the upper surface of the forming wire. A vacuum box was positioned below the forming wire to aid in deposition of the web and was set to 30 inches of water.

Sample 1:

The meltblown fibers were formed from Basell 650X Metocene MF650X is a propylene homopolymer having a density of 0.91 g/cm$^3$ and melt flow rate of 1200 g/10 minute (230° C., 2.16 kg), which is available from Basell Polyolefins. The patterned mat had the pattern depicted in FIG. 6 with round 0.25 inch diameter holes having a depth of 0.05 inches, the holes then corresponding with 0.25 inch diameter offset regions extending about 0.05 inches from one surface of the coform material. In a first direction, the holes were arranged in rows with the centers of the offset regions being spaced every 0.375 inches. The rows were staggered as shown in FIG. 6 with the offset regions in one row being aligned directly between the closest offset regions in the adjacent rows. The rows were spaced every 0.375 inches, resulting in an uninterrupted region between the rows having a width of 0.125 inches.

Samples for testing were wet out in the lab with the following solution:

| Component | Weight % |
| --- | --- |
| Water | 98.1774 |
| Potassium Laureth Phosphate | 0.6000 |
| Glycerin | 0.3002 |
| Polysorbate 20 | 0.3002 |
| DMDM Hydantoin | 0.2001 |
| Tetrasodium EDTA | 0.2001 |
| Methylparaben | 0.1499 |
| *Aloe Barbadensis* Leaf Extract | 0.0010 |
| Tocopheryl Acetate | 0.0010 |
| Malic Acid | 0.0700 |

The solution was hand sprayed to 270% add-on level. A dry basesheet was weighed on a scale and then multiplied by 2.7 to determine the amount of solution to be added to the dry basesheet. After adding the solution, the wet wipes were covered and allowed to equilibrate at least 24 hours prior to testing. Cup crush testing and thickness testing was done for the samples. The Cup Crush Energy to Thickness Ratio was calculated. Test results are listed in Table 1.

Samples 2:

These samples were the same as the Sample 1 except that the holes in the patterned mat had a depth of 0.1 inches, resulting in the coform having offset regions extending about 0.1 inches from the surface of the coform material.

Sample 3:

These samples were the same as Sample 1 except that the meltblown fibers were formed from a blend of 85 wt % propylene homopolymer (Achieve 6936G1) and 15 wt % propylene/ethylene copolymer (Vistamaxx 2330, density 0.868 g/cm$^3$, meltflow rate of 290 g/10 minutes (230° C., 2.16 kg)), both of which are available from ExxonMobil Corp.

Samples 4:

These samples were the same as the Sample 3 except that the holes in the patterned mat had a depth of 0.1 inches, resulting in the coform having offset regions extending about 0.1 inches from the surface of the coform material.

Commercial Products:

Various commercial baby wipes products were purchased and tested for comparison to the sample materials.

As is evident in Table 1, Samples 1-4 each demonstrated a lower Cup Crush Energy to Thickness Ratio than the Commercial Products.

TABLE 1

Test Results

| Code | Cup Crush Energy (wet) (g * cm) | Thickness (wet) (cm) | Basis Weight (dry) (g/cm 2) | Cup Crush Energy to Thickness Ratio (g) |
|---|---|---|---|---|
| Huggies ® Gentle Care Sensitive | 120.6 | 0.0812 | 0.006466 | 1490 |
| Huggies ® Natural Care | 116.3 | 0.0775 | 0.006379 | 1500 |
| Huggies ® Soft Skin | 131.4 | 0.0822 | 0.00689 | 1600 |
| Huggies ® Supreme | 183.2 | 0.081 | 0.007739 | 2260 |
| Pampers ® Natural Aloe | 51.2 | 0.062 | 0.005722 | 830 |
| Pampers ® Baby Fresh | 50.4 | 0.0605 | 0.00588 | 833 |
| Pampers ® Sensitive | 49.3 | 0.058 | 0.00596 | 850 |
| Sample 1 | 93.12 | 0.16 | 0.007215 | 580 |
| Sample 2 | 105.4 | 0.159 | 0.00718 | 663 |
| Sample 3 | 63.88 | 0.17 | 0.00714 | 380 |
| Sample 4 | 52.23 | 0.189 | 0.006934 | 276 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto. In addition, it should be noted that any given range presented herein is intended to include any and all lesser included ranges. For example, a range of from 45-90 would also include 50-90; 45-80; 46-89 and the like.

What is claimed is:

1. A wipe comprising a coform nonwoven web wherein the coform nonwoven web comprises a matrix of meltblown fibers, each smaller than 10 micrometers in diameter, wherein the meltblown fibers comprise a propylene/α-olefin copolymer and wherein the α-olefin includes ethylene, said meltblown fibers entangled with an absorbent fibrous material wherein said absorbent fibrous materials contains pulp fibers, the coform matrix of meltblown fibers and absorbent fibrous material comprising a continuous region and a plurality of offset regions in which the density of the continuous region is substantially equal to the density of the offset regions, the continuous region having a cross direction, a machine direction, and a thickness from about 0.01 millimeters to about 10.0 millimeters, the continuous region further comprising a planar first side extending in the cross direction and the machine direction and a planar second side opposite the first side, the first and second sides being separated by the thickness of the continuous region, the offset regions extending out from the first side, wherein the offset regions are positioned to define a plurality of first uninterrupted portions of the continuous regions, wherein the first uninterrupted portions of the continuous region do not underlie any offset regions, further wherein the first uninterrupted portions of the continuous region extend in a first direction in the plane of the first side, the first direction not intersecting any offset regions, and further wherein the width of the uninterrupted portions divided by the width of the offset regions is between about 0.3 and about 2.0, the widths measured perpendicular to the first direction in the plane of the first side, and even further wherein the continuous region extends completely under the offset regions; wherein the meltblown fibers constitute from 1 wt % to about 40 wt % of the web and the absorbent material constitutes from about 60 wt % to about 99 wt % of the web and wherein the Cup Crush Energy/Thickness ratio of the coform nonwoven web is less than about 600 grams.

2. The wipe of claim 1, wherein the basis weight of the continuous region is less than the basis weight of the offset regions.

3. The wipe of claim 1, wherein the offset regions extend from the first side by from about 0.25 millimeters to about 5.0 millimeters.

4. The wipe of claim 1, wherein the first uninterrupted portions of the continuous region extend in the first direction past at least two, three, or four different offset regions.

5. The wipe of claim 1, wherein the offset regions are further positioned to define a plurality of second uninterrupted portions of the continuous region, the second uninterrupted portions of the continuous region extending infinitely in a second direction without intersecting any offset regions.

6. The wipe of claim 5, where in the first direction is orthogonal to the second direction.

7. The wipe of claim 1, wherein the wipe contains from about 150 to about 600 wt % of a liquid solution based on the dry weight of the wipe.

* * * * *